United States Patent
Yoon et al.

(10) Patent No.: US 12,306,470 B2
(45) Date of Patent: May 20, 2025

(54) EXTENDED DEPTH OF FOCUS OPHTHALMIC LENS DESIGNS BASED ON CONTINUOUS PERIODIC REFRACTIVE POWER PROFILE

(71) Applicant: University of Rochester, Rochester, NY (US)

(72) Inventors: Geunyoung Yoon, Houston, TX (US); Jiakai Lyu, Houston, TX (US)

(73) Assignee: University of Rochester, Rochester, NY (US)

( * ) Notice: Subject to any disclaimer, the term of this patent is extended or adjusted under 35 U.S.C. 154(b) by 677 days.

(21) Appl. No.: 17/651,101

(22) Filed: Feb. 15, 2022

(65) Prior Publication Data

US 2022/0260854 A1 Aug. 18, 2022

Related U.S. Application Data

(60) Provisional application No. 63/150,809, filed on Feb. 18, 2021.

(51) Int. Cl.
G02C 7/02 (2006.01)

(52) U.S. Cl.
CPC ................... G02C 7/028 (2013.01)

(58) Field of Classification Search
USPC ...... 351/159, 159.11, 159.77, 160, 161, 164, 351/168, 169, 171; 359/558, 559, 737, 359/738, 739, 742, 743; 606/5; 623/6.3, 623/6.31

See application file for complete search history.

(56) References Cited

U.S. PATENT DOCUMENTS

| | | | |
|---|---|---|---|
| 4,898,461 | A | 2/1990 | Portney |
| 5,106,180 | A | 4/1992 | Marie et al. |
| 5,166,711 | A | 11/1992 | Portney |
| 5,166,712 | A | 11/1992 | Portney |
| 5,225,858 | A | 7/1993 | Portney |

(Continued)

FOREIGN PATENT DOCUMENTS

WO WO-2004113994 A2 12/2004

OTHER PUBLICATIONS

Lyu, Jiakai, et al., "Designing an extended depth of focus lens for presbyopia based on continuous periodic power profile," Jun. 2020, Investigative Ophthalmology & Visual Science, vol. 61, 583 (1 pg).

Primary Examiner — Stephone B Allen
Assistant Examiner — Daniel Jeffery Jordan
(74) Attorney, Agent, or Firm — Harris Beach Murtha Cullina PLLC

(57) ABSTRACT

A method to provide EDoF ophthalmic lens designs based on continuous periodic refractive power profile includes: providing an underlying optical correction lens surface curve; defining a periodic power map to provide a correction which optimizes focus based on a use case of a patient, while still providing a functional DoF over a range of distances; mapping the periodic power curve to a physical lens curvature profile; where there is an underlying optical correction, superimposing the physical lens curvature profile over the underlying optical correction; and providing a combination of the underlying optical correction, and physical lens curvature profile to physically manufacture an EDOF ophthalmic eyewear.

14 Claims, 14 Drawing Sheets

(56) References Cited

U.S. PATENT DOCUMENTS

| | | |
|---|---|---|
| 5,270,744 A | 12/1993 | Portney |
| 5,278,592 A | 1/1994 | Marie et al. |
| 5,408,281 A | 4/1995 | Zhang |
| 5,521,656 A | 5/1996 | Portney |
| 5,657,108 A | 8/1997 | Portney |
| 5,682,223 A | 10/1997 | Menezes et al. |
| 5,877,839 A | 3/1999 | Portney |
| 6,186,625 B1 | 2/2001 | Portney |
| 6,409,340 B1 | 6/2002 | Portney |
| 6,474,814 B1 | 11/2002 | Griffin |
| 6,527,389 B2 | 3/2003 | Portney |
| 6,814,439 B2 | 11/2004 | Portney |
| 7,859,769 B2 | 12/2010 | Zalevsky |
| 8,529,559 B2 | 9/2013 | Liang |
| 8,771,348 B2 | 7/2014 | Zhao |
| 11,079,596 B2* | 8/2021 | Hua ................... G02B 26/004 |
| 2007/0211214 A1* | 9/2007 | Dai ..................... A61B 3/0025 |
| | | 351/205 |
| 2011/0029073 A1 | 2/2011 | Liang |
| 2017/0115509 A1 | 4/2017 | Brennan et al. |
| 2022/0350169 A1* | 11/2022 | Sankaridurg ........... G02C 7/024 |

\* cited by examiner

The larger the areaMTF value is, the better the image quality.

The image quality is balanced through the 2.5D range with improved intermediate range with our design.

EXTENDED DEPTH OF FOCUS OPHTHALMIC LENS DESIGNS BASED ON CONTINUOUS PERIODIC REFRACTIVE POWER PROFILE

CROSS-REFERENCE TO RELATED APPLICATIONS

This application claims priority to and the benefit of U.S. provisional patent application Ser. No. 63/150,809, EXTENDED DEPTH OF FOCUS OPHTHALMIC LENS DESIGNS BASED ON CONTINUOUS PERIODIC REFRACTIVE POWER PROFILE, filed Feb. 18, 2021, which application is incorporated herein by reference in its entirety.

FIELD OF THE APPLICATION

The application relates to eyewear, particular to eyewear for preferred use cases.

BACKGROUND

Presbyopia is an ophthalmic condition where the eye loses the ability to focus near objects clearly due to lens aging. It can significantly affect the quality of life. Since eventually every person is undergoing this condition, it's important to find a solution to it. Spectacle-free treatment can be achieved by contact lenses and intraocular lenses. A lens with bi-focus, multi-focus or extended depth of focus (EDoF) allows clear vision of objects from far to near. Bifocal and trifocal diffractive lenses could extend depth of focus (DoF), but suffer from degraded image quality between focal points. Existing EDoF lens can hardly reach continuous and large (>2D) DoF.

SUMMARY

A method to provide EDoF ophthalmic lens designs based on continuous periodic refractive power profile includes: providing an underlying optical correction lens surface curve where needed; defining a periodic power map to provide a correction which emphasizes an individual use case, while still providing a functional DoF for other uses; mapping the periodic power curve to a physical lens curvature profile; where there is an underlying optical correction, superimposing the physical lens curvature profile over the underlying optical correction; and providing the combined underlying optical correction, if any, and physical lens curvature profile to physically manufacture an EDoF ophthalmic eyewear.

The periodic power curve can include a plurality of about triangularly shaped power curves.

As an example, the mapping of one period can be defined by the equation:

$$\phi(r) = A(r) * tri\left(\left(\frac{2rM}{R}\right)^N\right) * P,$$

where $\phi$ is the power at a radial distance r from pupil center, P is a dioptric power range, N is an exponential power inside the triangular function 'tri', M determines the number of cycles within a pupil with radius R, and A(r) is a pupil apodization function that controls the overall power profile, and there are M cycles of such mapping across the pupil. The mapping of one period can also be defined by the equation:

$$\phi(r) = A(r) * \sin\left(\left(\frac{\pi r M}{R}\right)^N\right) * P, \left(0 < r < \frac{R}{M}\right).$$

The eyewear can include eyeglasses or at least one contact lens. The eyewear can include a Scleral lens. The eyewear can include an implantable intraocular lens. The eyewear can include an implantable ophthalmic lenses (IOL). The eyewear can include laser refractive surgery. The eyewear can include an electronically-controlled lens. The eyewear can include a liquid crystal or a liquid lens.

The periodic power curve can include an amplitude or amplitude variation for a given use case. The periodic power curve can include a periodicity or variation in periodicity for a given use case. The periodic power curve can include at least one cycle of a different cycle width than other cycles of the periodic power curve. The periodic power curve can include a cycle width variation between cycles. The periodic power curve can include a periodicity variation between cycles. The periodic power curve can include an amplitude variation between cycles.

The use case can include reading eyewear or computer eyewear. The use case can include distance eyewear or driving eyewear.

The foregoing and other aspects, features, and advantages of the application will become more apparent from the following description and from the claims.

BRIEF DESCRIPTION OF THE DRAWINGS

The features of the application can be better understood with reference to the drawings described below, and the claims. The drawings are not necessarily to scale, emphasis instead generally being placed upon illustrating the principles described herein. In the drawings, like numerals are used to indicate like parts throughout the various views.

DETAILED DESCRIPTION

Figure 1:
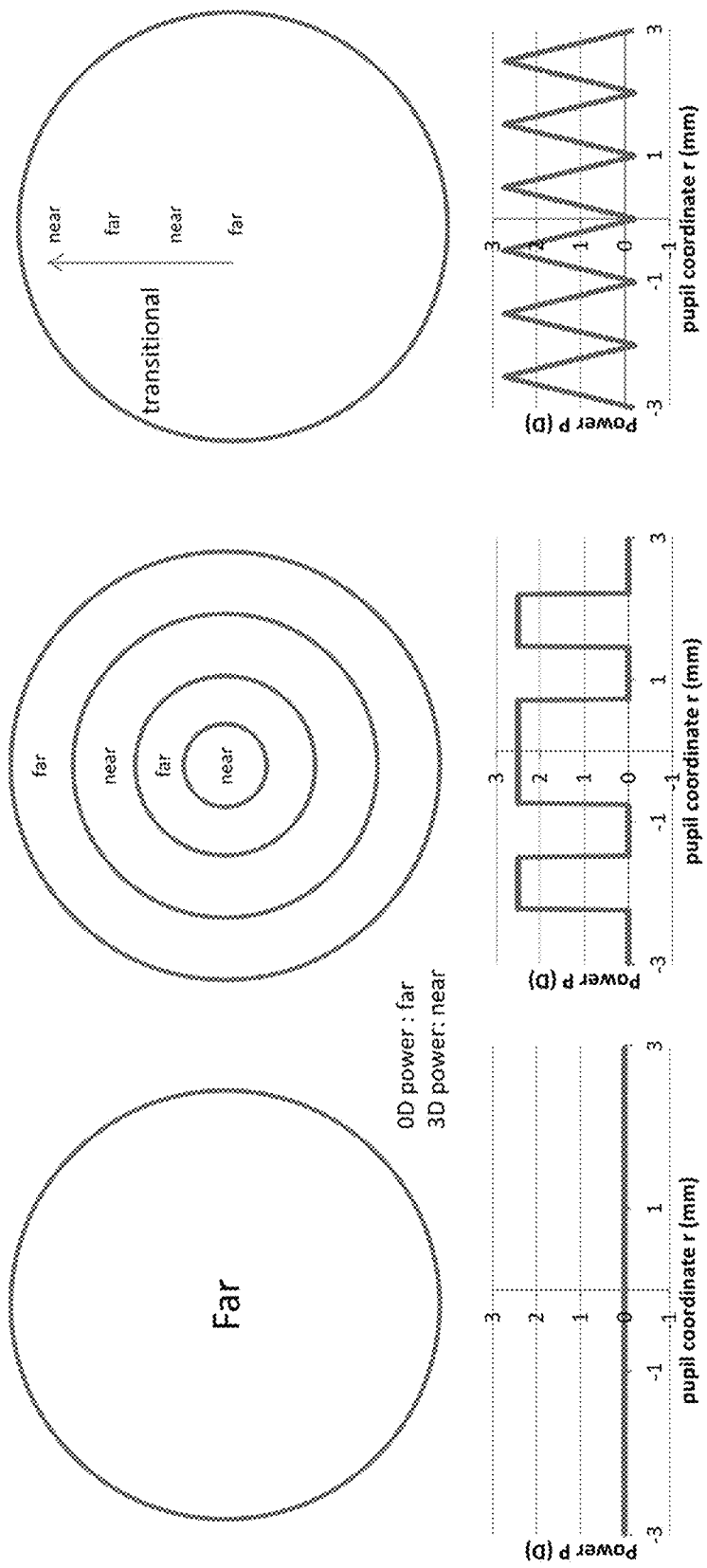
FIG. 1 is a drawing showing comparisons of monofocal and bifocal designs of the prior art compared to an exemplary extended depth of focus ophthalmic (EDoF) lens structure according to the Application (far right)

The Appendices are part of and included in this description.

Definitions

Eyewear—Eyewear as used hereinbelow and generally throughout the Application is expressly defined to include a variety of vision correction methods. The corrective structures and methods of the Application can be implemented by any suitable methods that are available now or in future. This includes (however, is not limited to) glasses, soft/hard/scleral contact lenses, implantable ophthalmic lenses (e.g. IOL), laser refractive surgery, electronically-controlled lenses (e.g. liquid crystal and liquid lens), etc. Eyewear does not require the addition of new components, where, for example, the structure of eyewear caused by laser refractive surgery is a newly modified and added structural shape to the original material of the human eye. Eyewear also expressly includes an implantable lens, such as an intraocular lens or an ophthalmic lens.

Use Case—Use case is defined hereinbelow and generally throughout the application as a user preferred use case or a user needed use case, for example, eyewear preferred for reading or computer activities. Other use cases include, for example, distance, driving, etc. An individual use case of a corrected lens according to the Application is relatively easy to implement along with individualized (or customized) corrections based on patient's needs (e.g. an underlying patient prescription for normal corrective eyewear to correct aberrations of the patient's eye sight).

Corrective lenses include, for example, eyeglasses contact lenses, and intraocular lenses. Corrective lenses typically correct for the optical aberrations of an individual's eyes. Typically, such corrections (e.g. eyewear optical prescriptions) include at least refractive corrections, commonly corrections for astigmatism, and possibly higher order and/or more unusual corrections, such as, for example for chromatic aberration.

Corrective lenses can be provided for eyewear according to a user's use case, including, for example, reading eyewear, computer eyewear, distance eyewear, driving eyewear, etc. Eyewear is typically in the form of eyeglasses or contact lenses. Or, corrections can be written, such as, by a laser, directly onto a cornea of the eye.

We have realized a new system and method to further modify the underlying corrective prescription to make improved eyewear, which can be tailored to an individual's most prevent use case, yet also provide useable vision across a much larger depth of vision. The new system and method applies a periodic power waveform which is transformed or mapped into a physical curvature which modifies the underlying correct lens surface. The modified lens surface can be manufactured using known eyewear production methods and materials. What is new is this secondary modification to the underlying corrective lens shape, or the new curvature alone, in the unusual case of no underlying correction.

The new system and method begins with a periodic power waveform versus pupil coordinate. There are a number of degrees of freedom of adjustment for both use case (e.g. computer contact lenses) as well as to optimize focus at other ranges. The amplitude of the periodic pattern can be adjusted and/or include an amplitude variation or modulation (however, typically is a constant amplitude). The periodicity can be varied for more cycles or less cycles yielding a control of granularity of the correction. Finally, the width of the cycles can be varied, together as above, or individually, that is, there can be different cycles widths.

The examples of the Appendices, and our experimental implementation eyewear to date has been based on triangle power patterns. For example, the periodic power curve can include a plurality of about triangularly shaped power curves. However, the equation of the Appendices can be adapted to other shapes, such as, for example, $$\phi(r) = A(r) * \sin\left(\left(\frac{\pi r M}{R}\right)^N\right) * P, \left(0 < r < \frac{R}{M}\right).$$

Another goal of this Application is to propose a new approach to designing refractive presbyopia-correcting ophthalmic lenses with a large continuous DoF and pupil size independency. For example, a design example was found and used to evaluate the performance through focus. The area MTF was well balanced through 2.5D of DoF for a range of pupil sizes (from 3 mm to 5 mm). The orientation of the 20/20 letter 'E' on a visual acuity chart was clearly recognized subjectively over defocus ranging from 0 to 2.5D.

In the following description, the new EDoF ophthalmic lens designs based on continuous periodic refractive power profile is described in more detail, including exemplary experimental implementations.

FIG. 1 is a drawing showing comparisons of monofocal (left: far) and bifocal (middle: near, far, near, far) designs of the prior art compared to an exemplary extended depth of focus ophthalmic (EDoF) lens structure based on continuous periodic refractive power profile according to the Application (right: far, near, far, near). Generally speaking, the transitional areas (circle) can be designed to go either from far to near or from near to far, including combinations thereof.

Figure 2:
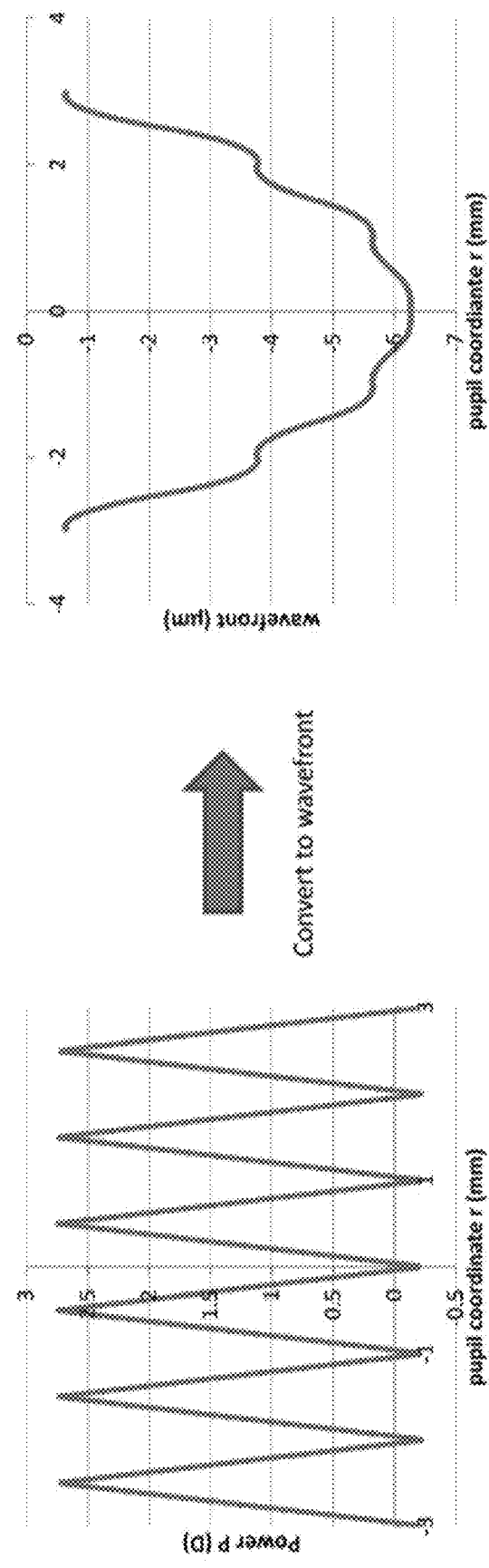
FIG. 2 is a drawing showing graphs an exemplary wavefront profile generated by a lens according to the Application.

FIG. 2 is a drawing showing graphs an exemplary wavefront profile generated by a lens according to the Application. P was a dioptric power range within each cycle, N was the exponent of the expression inside the triangular function (tri). M determined the number of cycles within a pupil with radius R, and A(r) was an apodization function.

Figure 3:
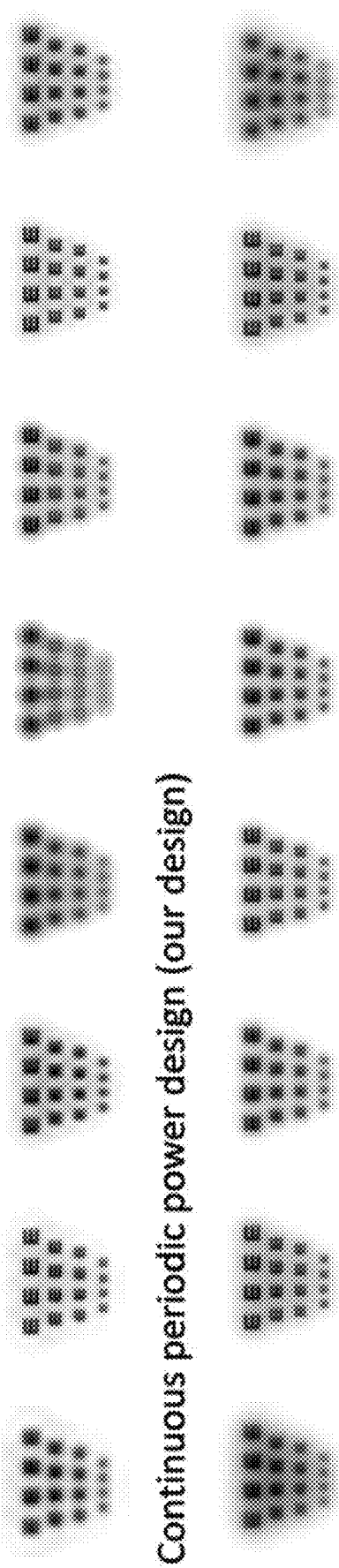
FIG. 3 is a drawing showing a performance comparison for an exemplary 4 mm pupil.

FIG. 3 is a drawing showing a performance comparison for an exemplary 4 mm pupil.

Figure 4:
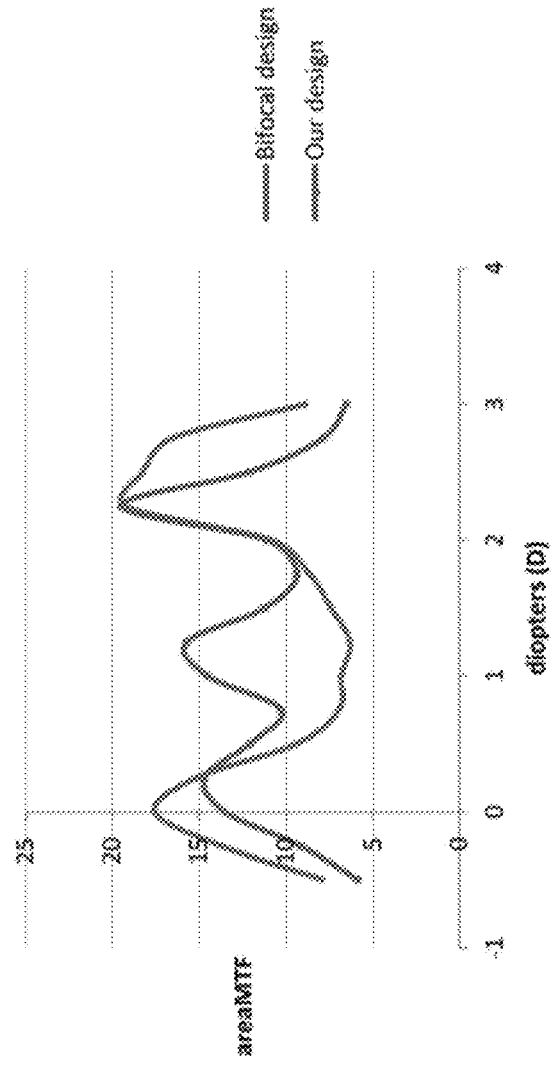
FIG. 4 is a drawing showing a graph of an exemplary area MTF comparison at a 4 mm pupil.

FIG. 4 is a drawing showing a graph of an exemplary area MTF comparison at a 4 mm pupil.

Figure 5:
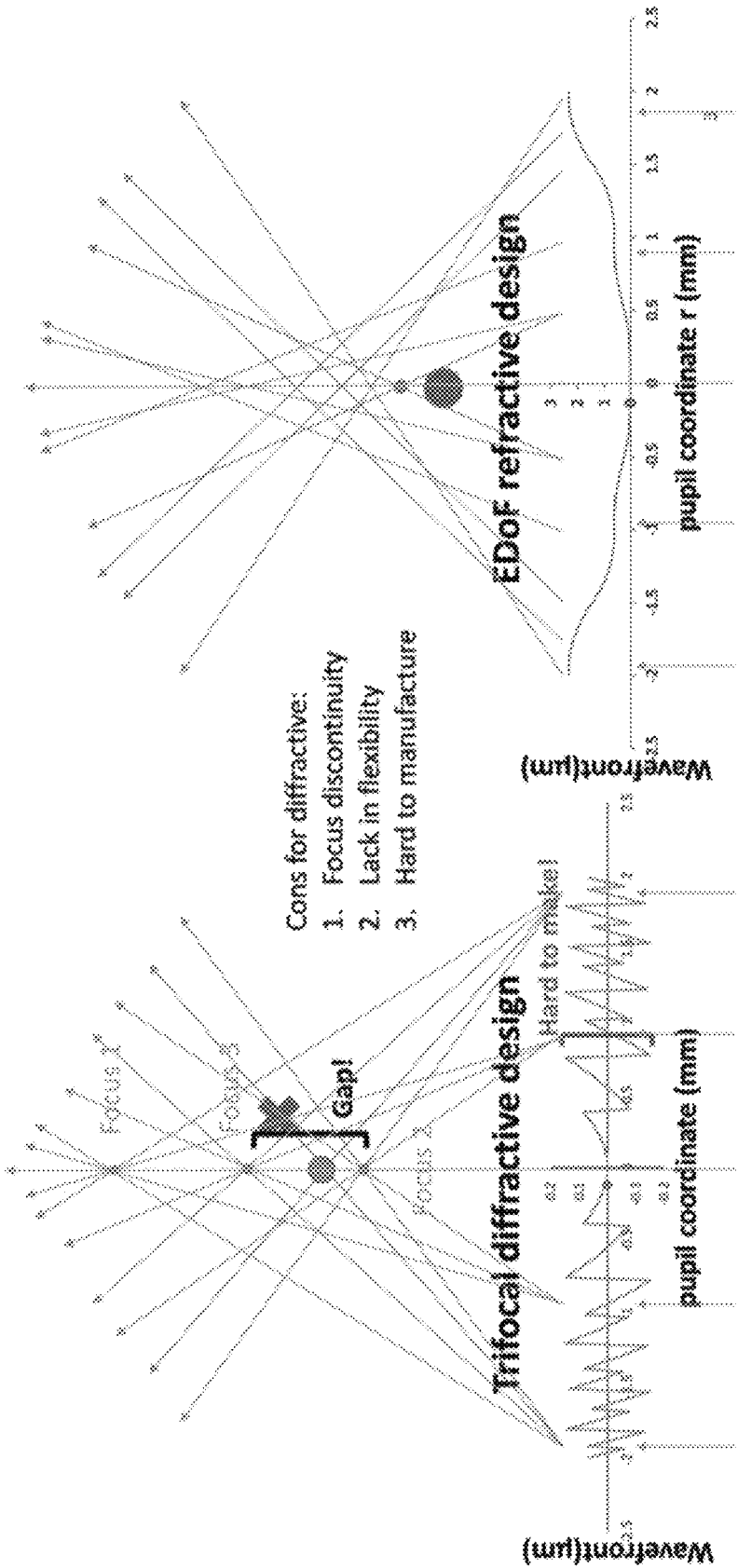
FIG. 5 is a drawing comparing diffractive vs. refractive lens approaches.

FIG. 5 is a drawing comparing diffractive vs. refractive lens approaches. Drawbacks (cons) for diffractive approaches include, focus discontinuity, lack of flexibility, and difficult to manufacture.

Figure 6:
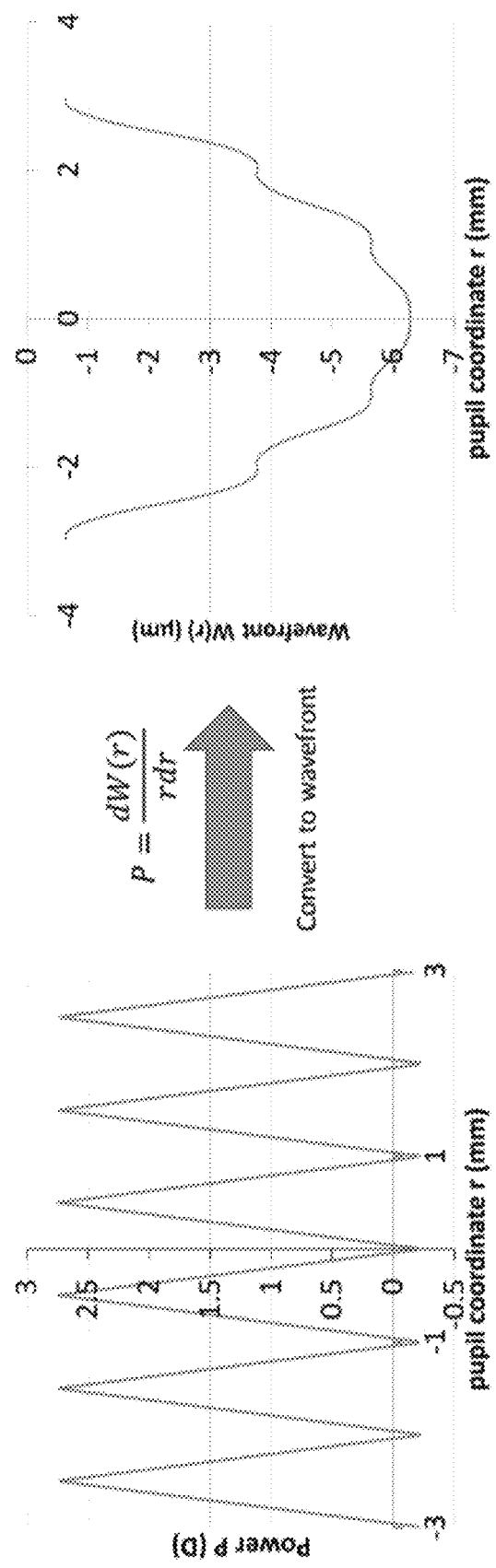
FIG. 6 is a drawing showing graphs of an exemplary iterative refractive extended depth-of-focus design according to the Application.
Figure 7:
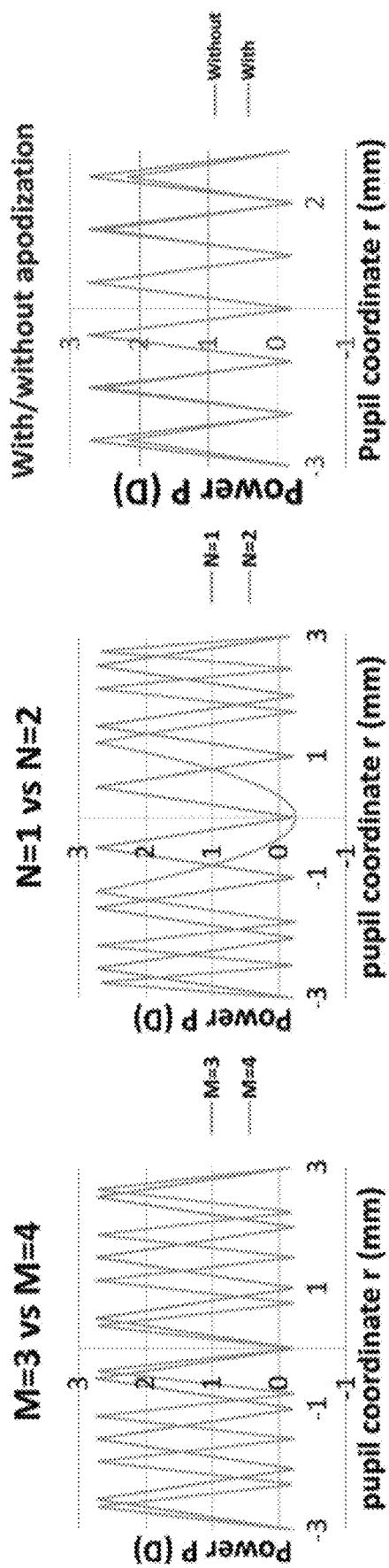
FIG. 7 is a drawing showing an example equation and corresponding graphs for an extended depth of focus ophthalmic (EDoF) lens designs based on continuous periodic refractive power profile according to the Application.
Figure 8:
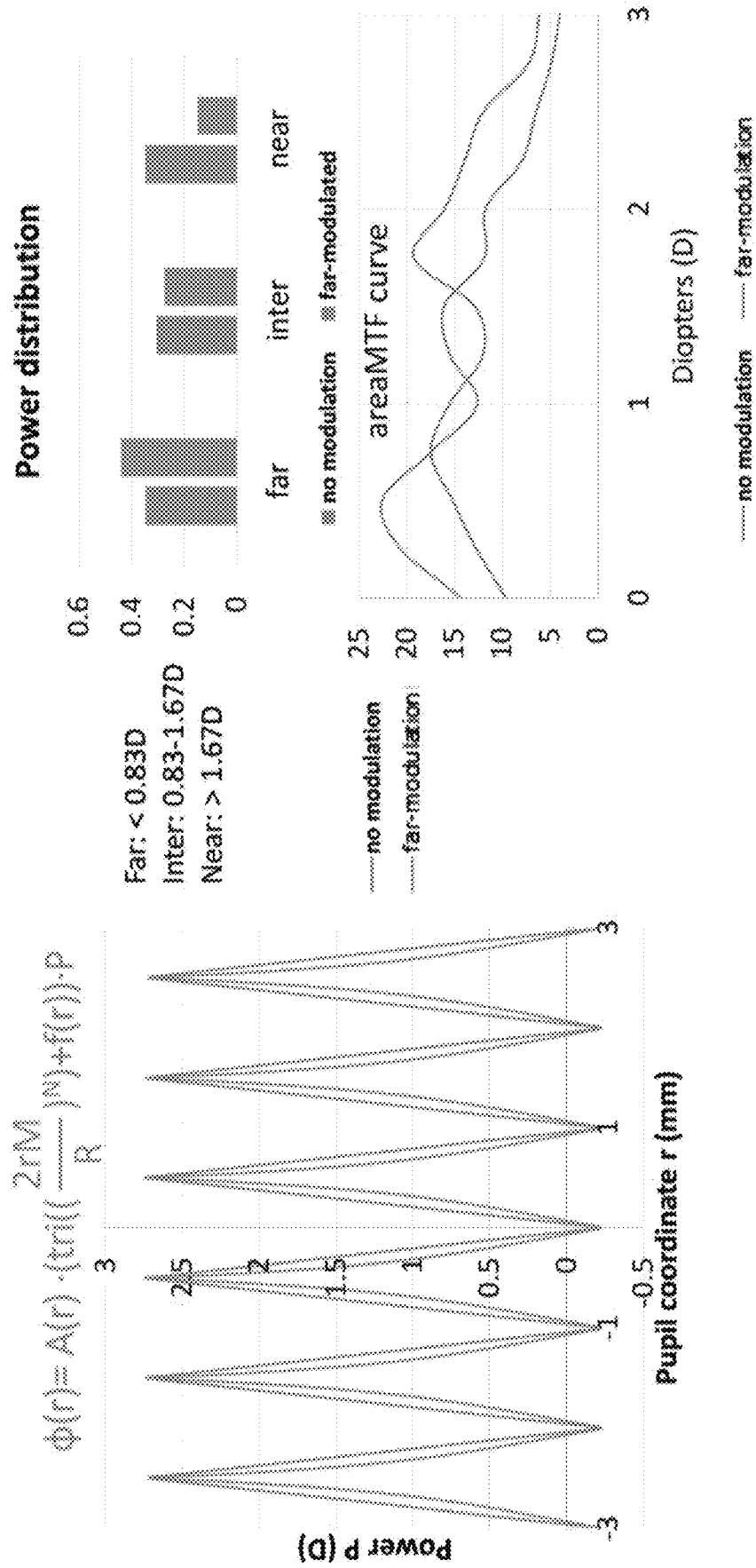
FIG. 8 is a drawing showing an example equation and corresponding graphs for an extended depth of focus ophthalmic (EDoF) lens designs based on a continuous periodic refractive power profile according to the Application optimized for far.
Figure 9:
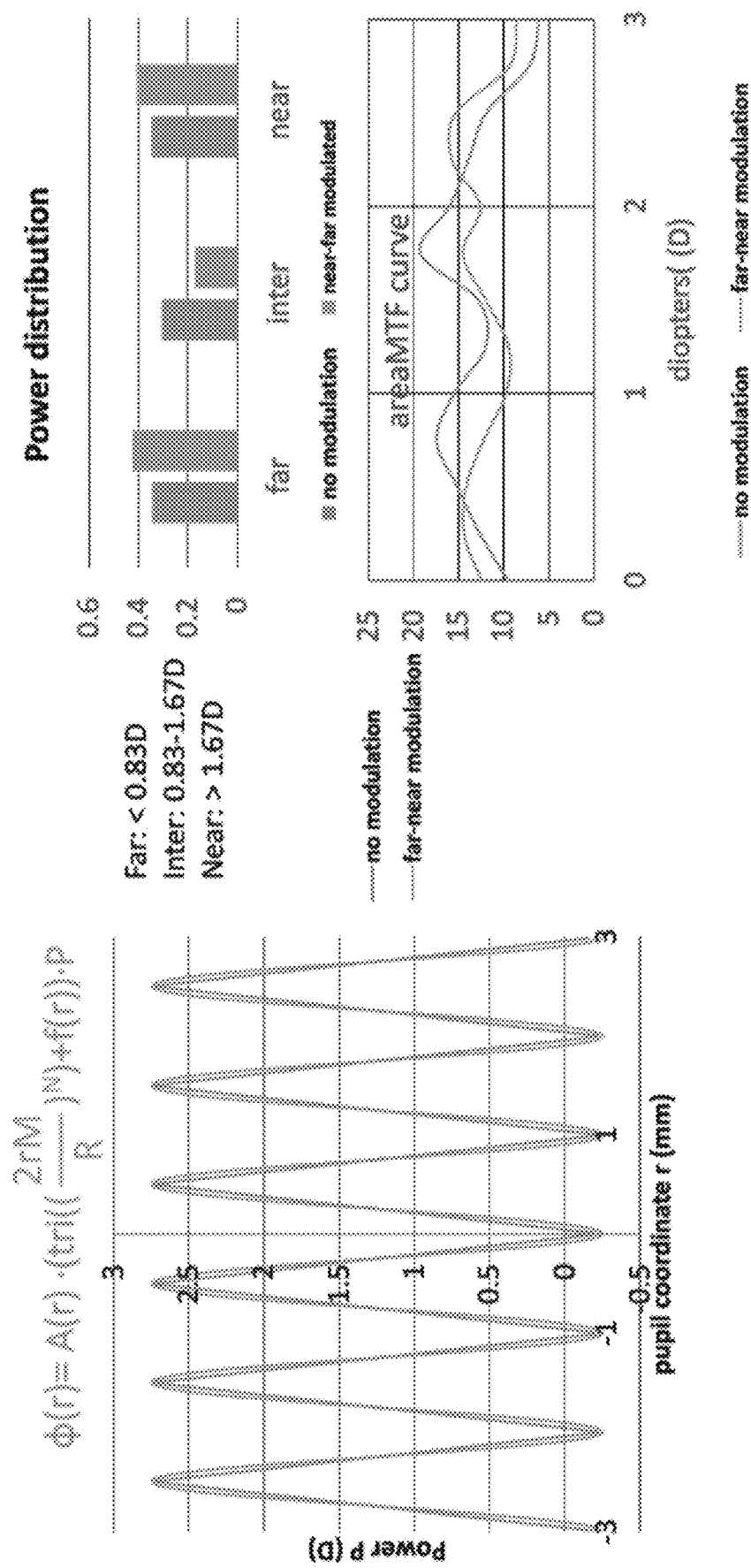
FIG. 9 is a drawing showing an example equation and corresponding graphs for an extended depth of focus ophthalmic (EDoF) lens designs based on continuous periodic refractive power profile according to the Application optimized for far and near.

FIG. 6 is a drawing showing graphs of an exemplary iterative refractive extended depth-of-focus design according to the Application. FIG. 7 is a drawing showing an example equation and corresponding graphs for an extended depth of focus ophthalmic (EDoF) lens designs based on a continuous periodic refractive power profile according to the Application. FIG. 8 is a drawing showing an example equation and corresponding graphs for an extended depth of focus ophthalmic (EDoF) lens designs based on a continuous periodic refractive power profile according to the Application optimized for far. FIG. 9 is a drawing showing an example equation and corresponding graphs for an extended depth of focus ophthalmic (EDoF) lens designs based on continuous periodic refractive power profile according to the Application optimized for far and near.

Figure 10:
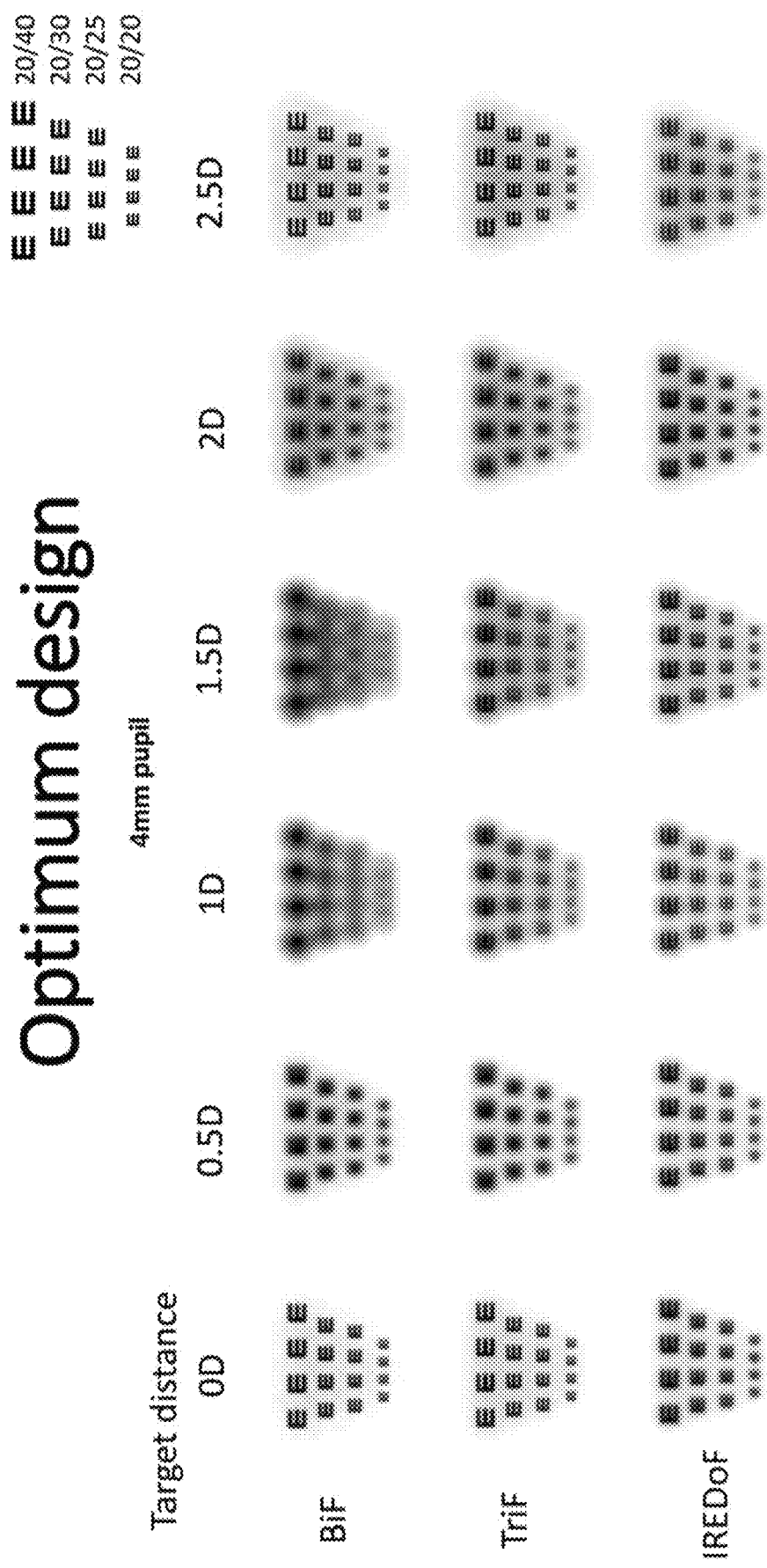
FIG. 10 is a drawing showing a performance for an exemplary optimized design with a 4 mm pupil.

FIG. 10 is a drawing showing a performance for an exemplary optimized design with a 4 mm pupil.

Figure 11:
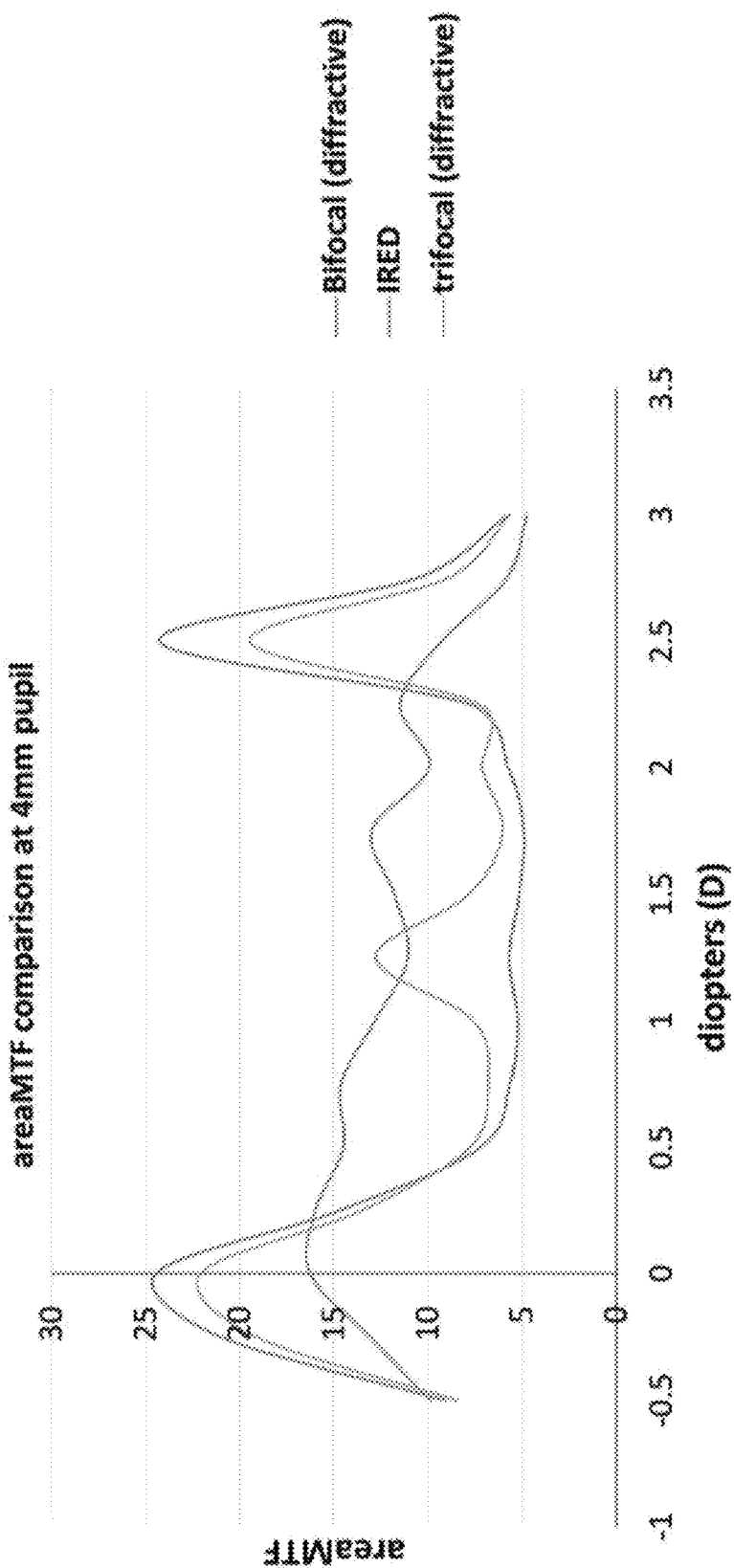
FIG. 11 is a drawing showing a graph illustrating how IREDoF can improve the intermediate range.

FIG. 11 is a drawing showing a graph illustrating how IREDoF can improve the intermediate range.

Figure 12:
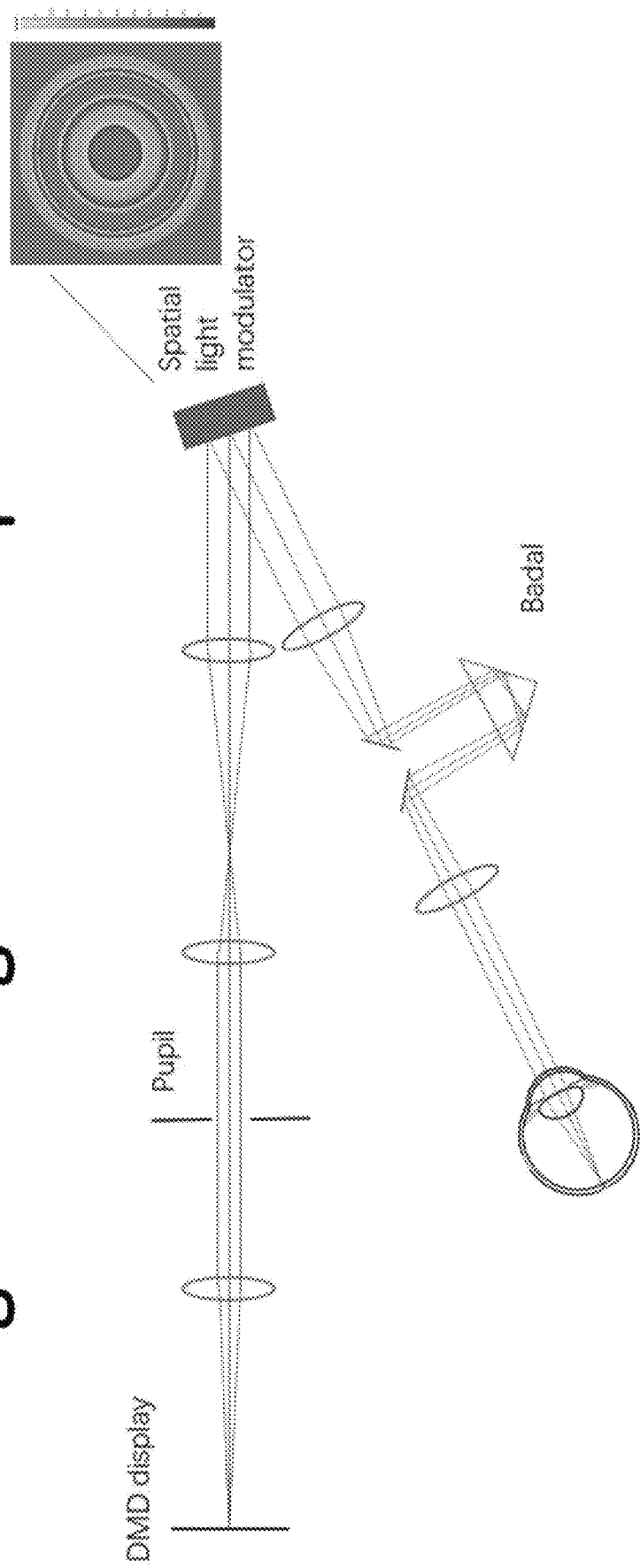
FIG. 12 is a drawing showing a schematic diagram of a special light simulator (SLM) for generating an aberration profile.

FIG. 12 is a drawing showing a schematic diagram of the optical bench testing system equipped with a special light simulator (SLM) for generating an aberration profile.

Figure 13:
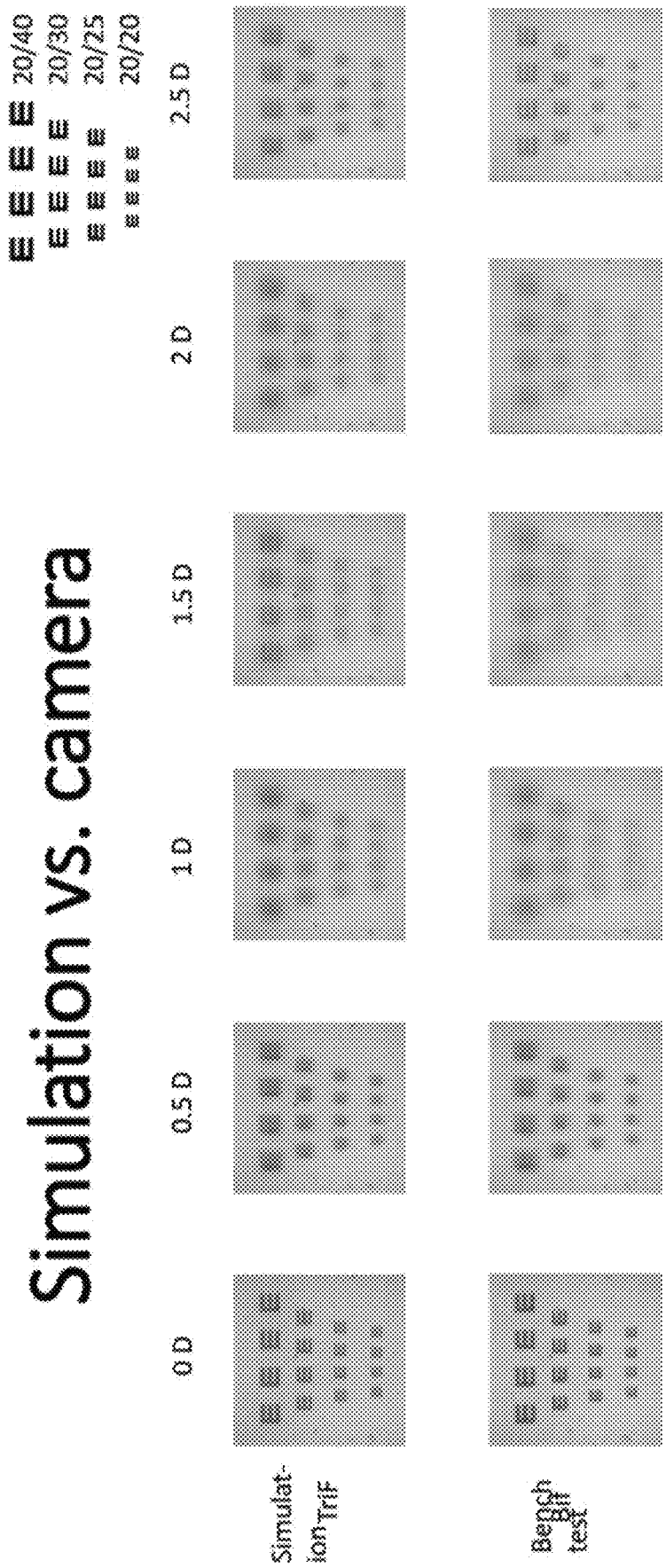
FIG. 13 is a drawing showing a performance for a simulation vs. a camera.

FIG. 13 is a drawing showing a performance for a simulation vs. a camera.

Figure 14:
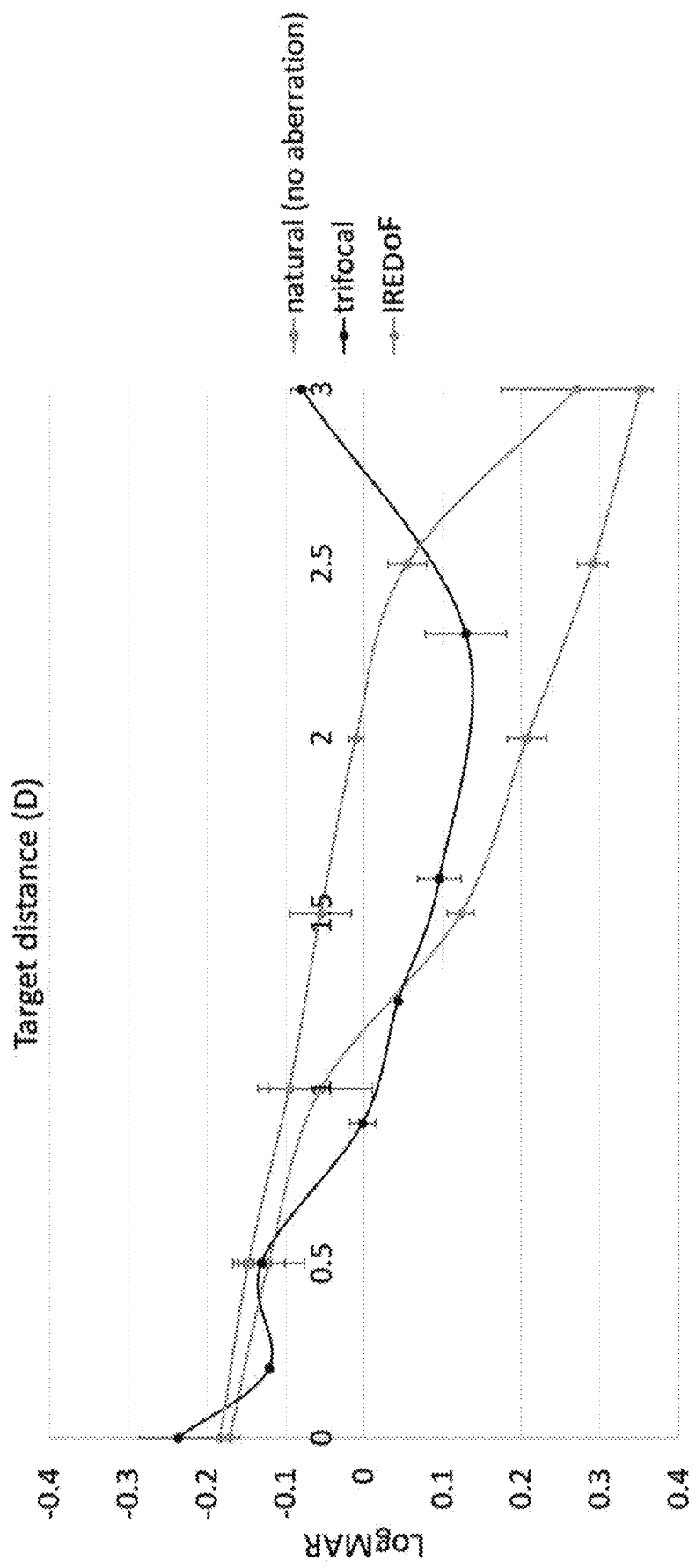
FIG. 14 is a drawing showing a graph illustrating IREDoF visual acuity from 0D to 2.5D.

FIG. 14 is a drawing showing a graph illustrating IREDoF visual acuity from 0D to 2.5D compared with a monofocal (natural) and trifocal.

The Application has described a new lens design structure and method. The new EDoF ophthalmic lens according to the Application can manipulate power distribution and optimize arbitrary dioptric ranges of interest. An iterative EDoF can provide a depth of focus for a desired dioptric range.

Corrective lenses according to the Application are relatively easy to implement with individualized (or customized) corrections based on patient's needs.

Software used to design the new EDoF ophthalmic lens according to the Application can be provided on a computer readable non-transitory storage medium. A computer readable non-transitory storage medium as non-transitory data storage includes any data stored on any suitable media in a non-fleeting manner Such data storage includes any suitable computer readable non-transitory storage medium, including, but not limited to hard drives, non-volatile RAM, SSD devices, CDs, DVDs, etc.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method to provide extended depth of focus ophthalmic (EDoF) lens designs based on a continuous periodic refractive power profile comprising:
    providing an underlying optical correction lens surface;
    defining a periodic power map to provide a correction which optimizes focus based on a use case of a patient, while still providing a functional depth of focus (DoF) over a range of distances;
    mapping a periodic power curve to a physical lens curvature profile, wherein mapping is defined by the equation:

$$\phi(r) = A(r) * tri\left(\left(\frac{2rM}{R}\right)^N\right) * P,$$

or the equation:

$$\phi(r) = A(r) * \sin\left(\left(\frac{\pi r M}{R}\right)^N\right) * P, \left(0 < r < \frac{R}{M}\right).$$

where $\phi$ is the power at a radial distance r from pupil center, P is a dioptric power range, N is an exponential power inside the triangular function 'tri', M determines the number of cycles within a pupil with radius R, and A (r) is a pupil apodization function, and there are M cycles of such mapping across the pupil;
    where there is an underlying optical correction, superimposing the physical lens curvature profile over the underlying optical correction; and
    where there is an underlying optical correction, providing a combination of the underlying optical correction, and the physical lens curvature profile to physically manufacture an EDoF ophthalmic eyewear.

2. The method of claim 1, wherein said eyewear comprises eyeglasses or at least one contact lens.

3. The method of claim 1, wherein said eyewear comprises a Scleral lens.

4. The method of claim 1, wherein said eyewear comprises an implantable intraocular lens.

5. The method of claim 1, wherein said eyewear comprises a modified and/or added structural shape to the original material of the human eye caused by a laser refractive surgery.

6. The method of claim 1, wherein said eyewear comprises an electronically-controlled lens.

7. The method of claim 6, wherein said electronically-controlled lens comprises a liquid crystal or a liquid lens.

8. The method of claim 1, wherein said periodic power curve comprises at least one cycle of a different cycle width than other cycles of said periodic power curve.

9. The method of claim 1, wherein said periodic power curve comprises a cycle width variation between cycles.

10. The method of claim 1, wherein said periodic power curve comprises a periodicity variation between cycles.

11. The method of claim 1, wherein said periodic power curve comprises an amplitude variation between cycles.

12. The method of claim 1, wherein said use case comprises a use case needed by the patient or a use case specified by the patient.

13. The method of claim 1, wherein said use case includes reading eyewear or computer eyewear.

14. The method of claim 1, wherein said use case includes distance eyewear or driving eyewear.

* * * * *